(12) United States Patent
Yu

(10) Patent No.: US 7,870,433 B2
(45) Date of Patent: *Jan. 11, 2011

(54) MINIMIZING SOFTWARE DOWNTIME ASSOCIATED WITH SOFTWARE REJUVENATION IN A SINGLE COMPUTER SYSTEM

(75) Inventor: Seong Ryol Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 178 days.

This patent is subject to a terminal disclaimer.

(21) Appl. No.: 12/049,296

(22) Filed: Mar. 15, 2008

(65) Prior Publication Data

US 2008/0163004 A1    Jul. 3, 2008

Related U.S. Application Data

(63) Continuation of application No. 11/245,309, filed on Oct. 6, 2005, now Pat. No. 7,454,661.

(51) Int. Cl.
*G01F 11/00* (2006.01)
(52) U.S. Cl. ........................................ 714/38
(58) Field of Classification Search ............... 714/38
See application file for complete search history.

(56) References Cited

U.S. PATENT DOCUMENTS

| 6,629,266 | B1 * | 9/2003 | Harper et al. | 714/38 |
| 6,760,391 | B1 * | 7/2004 | Alb et al. | 375/354 |
| 2004/0088580 | A1 * | 5/2004 | Cabrera et al. | 713/201 |
| 2004/0158588 | A1 | 8/2004 | Pruet, III | 707/204 |
| 2004/0199553 | A1 | 10/2004 | Byrne et al. | 707/204 |
| 2004/0268177 | A1 * | 12/2004 | Ji et al. | 714/6 |
| 2005/0071577 | A1 * | 3/2005 | Dias et al. | 711/151 |

FOREIGN PATENT DOCUMENTS

WO    WO 03/017104    2/2003

OTHER PUBLICATIONS

Mann et al., "A coherent distributed file cache with directory write-behind," ACM Trans. on Comp. Systems, v. 12, No. 2, May 1994, pp. 123-164.

* cited by examiner

*Primary Examiner*—Scott T Baderman
*Assistant Examiner*—Jigar Patel
(74) *Attorney, Agent, or Firm*—VanLeeuwen & VanLeeuwen; Justin M. Dillon

(57) ABSTRACT

An approach is provided that rejuvenates a software application to reduce the effects of software aging. An active replica corresponding to a software application is identified. If rejuvenation of the software application is appropriate, a new replica is created and state information is transferred from the active replica to the new replica. In addition, client requests are redirected to the new replica. After the state data has been transferred and requests have been redirected, the active replica is terminated. Once the active replica has been terminated, the new replica becomes the active replica. When rejuvenation is again proper, another new replica is created and the state data is transferred from the new active replica to the new replica and requests are redirected to the new replica. This process repeats whenever rejuvenation of the application is needed.

15 Claims, 7 Drawing Sheets

MINIMIZING SOFTWARE DOWNTIME ASSOCIATED WITH SOFTWARE REJUVENATION IN A SINGLE COMPUTER SYSTEM

RELATED APPLICATIONS

This application is a continuation application of co-pending U.S. Non-Provisional patent application Ser. No. 11/245,309, entitled "System and Method for Minimizing Software Downtime Associated with Software Rejuvenation in a Single Computer System," filed on Oct. 6, 2005, and issued as U.S. Pat. No. 7,454,661 on Nov. 18, 2008.

BACKGROUND OF THE INVENTION

1. Technical Field

The present invention relates in general to a system and method for software rejuvenation. More particularly, the present application relates to a system and method that proactively rejuvenates software applications on a single computer system in order to maintain software performance and improve availability.

2. Description of the Related Art

Using software applications for extended periods of time often results in degraded performance (i.e. increased response time or results that deviate from specifications) and application failure (i.e. application hanging or unexpected termination of application). Over time, a software program receives allocations of memory and, in some cases, creates additional objects. When the objects are no longer needed, the program normally dereferences it and then deallocates the associated memory. In the object programming paradigm, the object is dereferenced and the associated memory becomes what is commonly referred to as "garbage." Garbage collection is a routine that is periodically run to deallocate the memory marked as garbage.

During software design and development, many bugs are easily found, especially during the testing and debugging phases. However, many bugs remain in software that are often difficult to identify and fix. While a software program is running for an extended period of time, bugs inadvertently left in the software can cause degraded performance (i.e. increased response time or results that deviate from specifications) and failure (i.e. application hanging or unexpected termination of application) of the software program. This performance degradation and application failure is due to the "aging" of the software program. "Aging" refers to the characteristics of operational software that gradually degrade over time due to bugs in the application, or the middleware, or the operating system. The external symptoms include gradual degradation in performance, results that deviate from specifications, low memory or out-of-memory condition, other resource exhaustion, application hanging, or eventual application failure. Typical causes of software aging are resource leaks such as memory leaks, memory bloating, buffer overflows, data corruption, accumulation of round-off errors, and storage space fragmentation. The effects of software aging are transient in nature and restarting the application or rebooting clears up the problem. Adverse effects of software aging are preventable with a periodic application of the preemptive software rejuvenation.

Repeated additions and deletions of information in memory can cause fragmented condition such that no single space (e.g. page or buffer) in memory is large enough to hold more information. This is the condition referred to as storage space fragmentation. The continued program operation could be elongated by increasing the storage space (e.g. pagefile), however, the storage space will be depleted at some point. Rejuvenation is effective against storage space fragmentation.

While rejuvenation is helpful, rejuvenation is also disruptive to clients. Prior art provided various workaround solutions. Downtime scheduling during low periods of server usage has been recommended for single computer systems to minimize the cost of the downtime associated with rejuvenation. In other prior works, hardware redundancy has been used to mask the rejuvenation downtime so that client can continue to access the server during rejuvenation. Dual on-board computer system may provide continuous service to the client by alternating the on-duty and off-duty cycle. While one on-board computer is powered down (i.e. off-duty), a second on-board computer remains operational (i.e. on-duty) for a duty period to provide service to the clients. At the end of the duty period, the down computer is powered up, becomes operational, begins providing service to the clients, and the previously on-duty computer powers off. This cycle is repeated. Computer clusters have been used to mask the rejuvenation downtime in distributed and service oriented computing. In the computer cluster rejuvenation model, while a node is taken offline for reboot, other nodes in the cluster continue to process the requests. Hot-passive replication has been used in dual computer environment to provide rejuvenation transparency to the client. The rejuvenation is accomplished by switching the failure-probable primary-host with the robust secondary-host. The rejuvenation downtime, however, remains an issue when hardware redundancy is not used.

In a distributed (multiple-computer) setting, one approach is to rejuvenate individual nodes of a computer cluster by periodically re-booting the nodes. When a node is taken offline for rejuvenation, the other nodes in the cluster continue to process requests. However, the approach does not work when clustered computing cannot be used, such as in a single-computer setting.

In a single computer setting, at least two traditional approaches are used to address software aging. First, the computer system can be periodically booted. Rebooting forces the operating systems and applications running on the operating system to begin anew, thereby resetting the age of the operating system and the applications. Second, one or more individual applications can be terminated and restarted, thereby resetting the age of the restarted applications. The challenge of both of these approaches is that the application is offline for some amount of time. During this time it is unavailable to users who have to wait until the application are restarted and the data that was being processed by the application is reloaded.

What is needed, therefore, is a system and method that seamlessly rejuvenates one or more software applications on a single computer system. What is further needed is a system and method that rejuvenates the software applications without rebooting the computer system.

SUMMARY

It has been discovered that the aforementioned challenges are resolved using a system and method that identifies an active replica corresponding to a software application. If rejuvenation of the software application is appropriate, a new replica is created and state information is transferred from the active replica to the new replica. In addition, the client requests are redirected to the new replica. After state data has been transferred and requests have been redirected, the active replica is terminated. Once the active replica has been terminated, the new replica becomes the active replica. When rejuvenation is again proper, another new replica is created and the state data is transferred from the new active replica to the new replica and requests are redirected to the new replica. This process repeats whenever rejuvenation of the application is needed.

As used herein, an "active replica" is an instance of a software application that is used by one or more clients (such as users or another application) until the active replica is replaced by a "new replica" which, in turn, then becomes the active replica. As used herein, a "new replica" is an instance of the same software application that corresponds to the active replica. Also, as used herein, a "software application" is any computer process that can be invoked by a client (i.e., a user) or by another process that is external to the computer process.

In one embodiment, the client process locates the active replica using a name server. The client requests the handle of the active replica that corresponds to an application name provided by the client process. The name server looks up the active replica for the given application and returns the handle to the client process. When rejuvenation takes place and the active replica is replaced by a new replica, the client process receives an error when using the original handle to communicate with the application. When this error occurs, the client process requests the new handle of the new replica (the new active replica) from the name server. In this manner, the application program can be rejuvenated with a new replica taking the place of an active replica with minimal impact to the client process. As used herein, a "handle" is a token, such as a pointer, that provides access to a running instance of an application (e.g., provides a client process with access to the active replica that corresponds to an application program). As used herein, a "name server" is a process that correlates application names to their respective handles. As used herein, a "name server" operates on the same computer system as the application programs. When an application is rejuvenated (i.e., a new replica takes over for an active replica), the handle corresponding to the new replica is provided to the name server and stored in place of the active replica's handle. In this manner, when the client looks for the replica corresponding to the application program the name server will return the handle of the correct replica.

In one embodiment, a rejuvenation manager is used to initiate rejuvenation of one or more software applications. The rejuvenation manager selects applications from a list of active (i.e., running) applications and reads a rejuvenation profile (if available) for the various applications. The rejuvenation manager determines whether the application supports rejuvenation and whether the application is currently being rejuvenated. If the application supports rejuvenation and is not currently being rejuvenated, the rejuvenation manager then determines, based on the application's rejuvenation profile, whether to rejuvenate the application. In one embodiment, applications selected for rejuvenation are written to a rejuvenation list. In this embodiment, an optional limit can be established limiting the number of applications that can be rejuvenated at one time. If the number of applications in the rejuvenation list is greater than the limit, then the rejuvenation list is edited with some of the applications being removed from the list. In one embodiment, the rejuvenation list uses priority, or importance criteria, that may be stored in the rejuvenation profile, to determine which applications to remove from the rejuvenation list.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
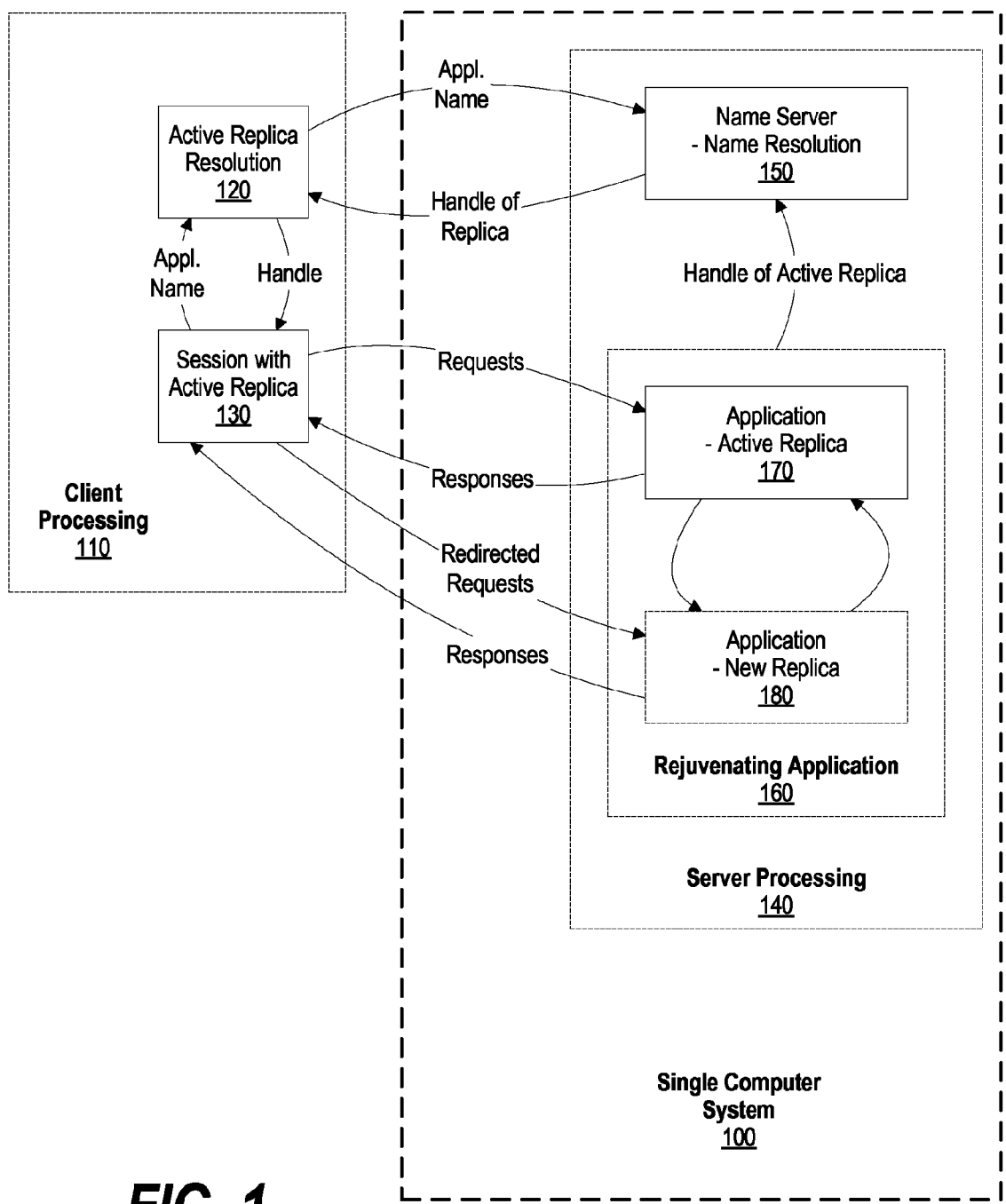
FIG. 1 is a high level diagram showing components used to rejuvenate an application on a single computer system.

FIG. 1 is a high level diagram showing components used to rejuvenate an application on a single computer system. Computer system 100 is a single computer system. While computer system 100 may interoperate (i.e., via a network) with other computer systems, the rejuvenation processing takes place within a single computer system. Computer system 100 includes server processing 140 which include one or more rejuvenating applications 160 and name server 150. Rejuvenating application 160 includes active replica 170 and new replica 180. Active replica 170 is the instance of the application that processes client requests and returns responses to the client. As active replica 170 ages its performance may degrade. When this occurs, new replica 180 takes over processing for active replica 170. This involves transferring state data (if any) from the active replica to the new replica and redirecting client requests from the active replica to the new replica. In one embodiment, the new replica is initiated when server rejuvenation processing identifies the need for rejuvenation. In another embodiment, the new replica is initiated sometime before rejuvenation is needed (e.g., at or near the time that the active replica is initiated). In this embodiment, the active replica shares state information with the new replica throughout the life of active replica.

Client processing 110 can occur on computer system 100 or on a remote computer system connected to computer system 100 through a computer network. Client processing 110 includes at least two sub-processes. Active replica resolution process 120 determines the handle of the active replica for the desired application. Active replica resolution process 120 sends the application name to name server 150 maintained by computer system 100. Name server 150 is a process that keeps track of the active replica corresponding to various applications within server processing 140. Name server 150 responds by sending the client the handle of the active replica. If the active replica changes (i.e., active replica 170 is replaced by new replica 180 due to rejuvenation), the name server responds with the handle of the new replica. Client processing 110 also includes session processing 130 with the active replica. In one embodiment, the client retrieves the handle of the active replica prior to sending each request to the active replica.

In another embodiment, session 130 continues sending requests and receiving responses from the active replica until an error occurs indicating that the active replica is unavailable. When this error occurs, session 130 requests a new handle for the application which is resolved using the name server. The name server is provided with the handle for new replica 180 when the application is rejuvenated and this handle is returned to the client. Session 130 now sends redirected requests to new replica 180 and receives responses from the new replica. The new replica is now the new "active" replica. The process of rejuvenating the active replica with a new replica can be repeated as many times as needed to reduce the effects of aging on the software application.

Figure 2:
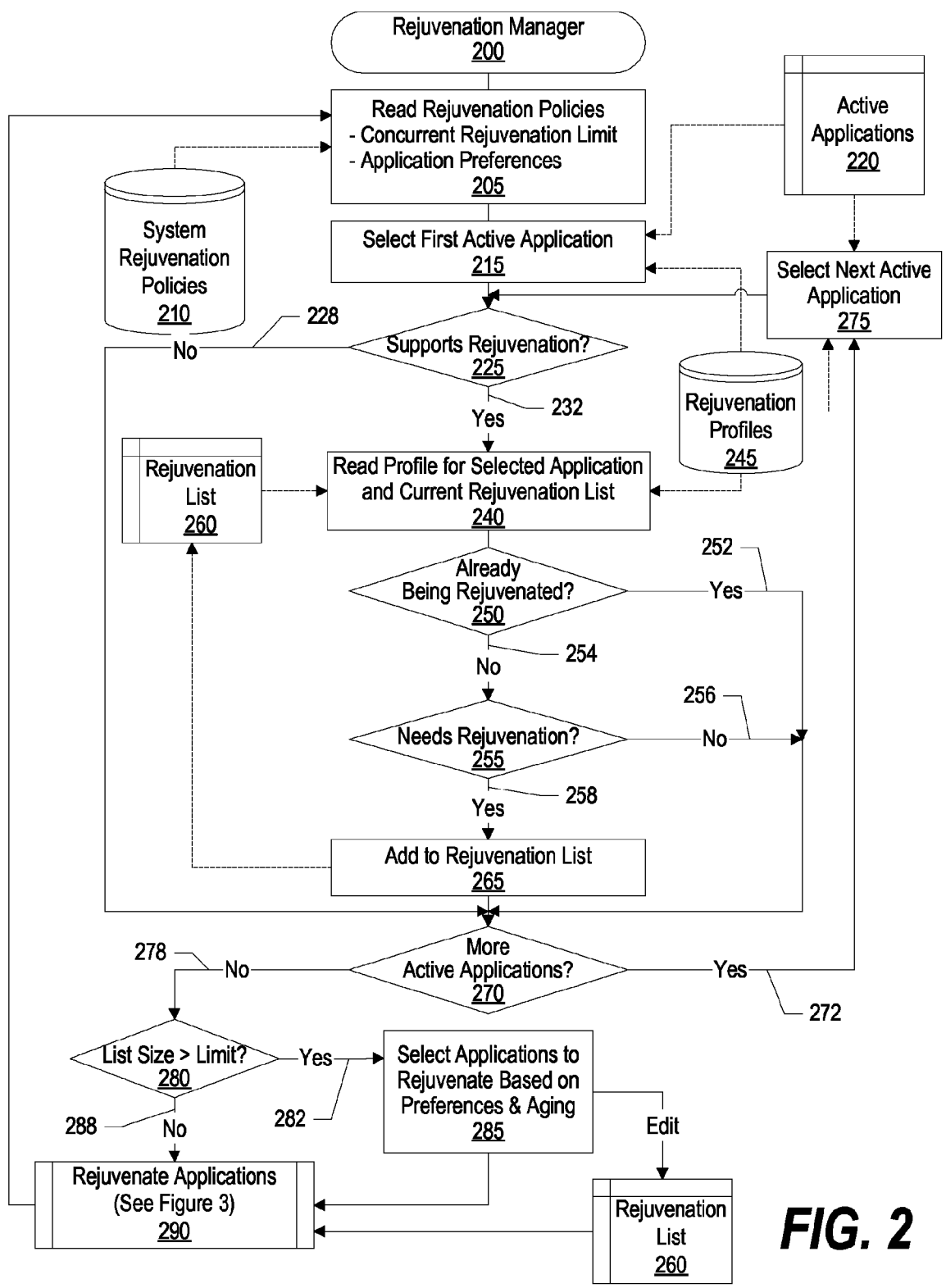
FIG. 2 is flowchart showing steps taken by a rejuvenation process that manages the rejuvenation of software applications on the computer system.

FIG. 2 is flowchart showing steps taken by a rejuvenation process that manages the rejuvenation of software applications on the computer system. Rejuvenation manager processing commences at 200 whereupon, at step 205, the rejuvenation policies for the computer system are read from data store 210. The rejuvenation policies include a concurrent rejuvenation limit as well as application preferences. The concurrent rejuvenation limit is a limit of the number of applications that can be rejuvenated at the same time. Recognizing that rejuvenating several applications simultaneously may drain system resources, a limit can be applied. In addition, preference information can be supplied so that some applications are preferentially rejuvenated over other applications. These policies can also take into account the aging that is evident in the various applications. For example, a policy could be established so that only two applications can be simultaneously rejuvenated with an order entry application being treated preferentially over an order retrieval application. However, if the order retrieval application has aged more substantially than the order entry application, the rejuvenation preference can be reversed. Aging can be calculated in many different ways as known by those skilled in the art. These ways include the amount of time an application has been running and the decreasing efficiency (e.g., throughput) of the application over time.

The rejuvenation manager loops through the active applications to select applications for rejuvenation. At step 215, the first active application is selected from list 220 of active applications. In one embodiment, the list of active applications is retrieved from the operating system. For example, in the Windows XP™ operating system, a list of applications and processes currently running is maintained by the Windows Task Manager.

A determination is made as to whether the selected application supports rejuvenation (decision 225). In one embodiment, this determination is made by identifying a rejuvenation profile (data store 245) that corresponds to the application (i.e., when a rejuvenation profile is found, then the application supports rejuvenation). If the application does not support rejuvenation, decision 225 branches to "no" branch 228 which bypasses the remainder of the rejuvenation steps. On the other hand, if the application supports rejuvenation, decision 225 branches to "yes" branch 232 whereupon, at step 240, the rejuvenation profile for the selected application is read. The rejuvenation profile includes settings that trigger when rejuvenation of the application should take place. For example, rejuvenation of an application could be set every hour, whenever a measurable throughput degrades past a certain threshold, or any number of aging factors that may affect the application. In addition, current rejuvenation list 260 is read to see if the selected application is already in the rejuvenation list (indicating that the selected application is already being rejuvenated).

A determination is made as to whether the selected application is already being rejuvenated (decision 250). If the selected application is already being rejuvenated, then decision 250 branches to "yes" branch 252 bypassing the remainder of the steps. On the other hand, if the application is not currently being rejuvenated, decision 250 branches to "no" branch 254 whereupon another determination is made as to whether the selected application needs to be rejuvenated based upon the application's current operating condition and the settings retrieved from the application's rejuvenation profile. If the application does not need rejuvenation at this time, decision 255 branches to "no" branch 256 bypassing step 265. On the other hand, if the applications needs to be rejuvenated, decision 255 branches to "yes" branch 258 whereupon, at step 265, the application is added to rejuvenation list 260.

After the selected application has been processed, a determination is made as to whether there are more active applications that need to be processed (decision 270). If there are more applications to process, decision 270 branches to "yes" branch 272 whereupon, at step 275, the next active application is selected, and processing loops back to determine whether to add the newly selected application to rejuvenation list 260. This looping continues until there are no more active applications to process, at which time decision 270 branches to "no" branch 278 in order to process the rejuvenation list.

A determination is made as to whether the number of applications in the rejuvenation list exceeds the concurrent rejuvenation limit previously read from the system rejuvenation policies (decision 280). If the number of applications in the rejuvenation list exceeds the concurrent rejuvenation limit, then decision 280 branches to "yes" branch 282 whereupon, at step 285, applications in the rejuvenation list are selected based on preferences and aging factors. Applications that are not selected are then removed from rejuvenation list 260. Returning to decision 280, if the number of applications listed in rejuvenation list 260 is not greater than the concurrent rejuvenation limit, then decision 280 branches to "no" branch 288 bypassing step 285.

Figure 3:
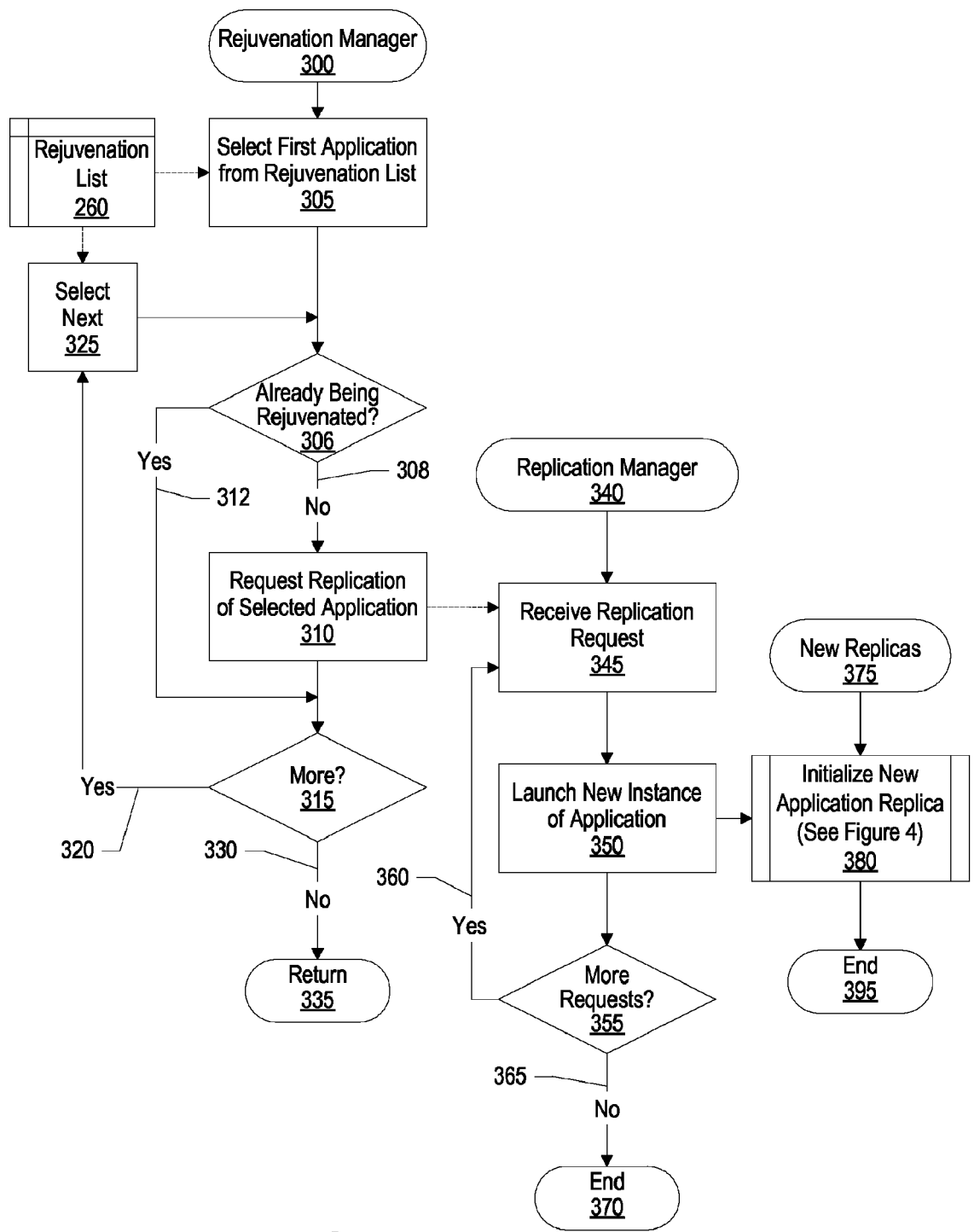
FIG. 3 is a flowchart showing the interaction between the rejuvenation manager, the replication manager, and the new software application replicas.

After the rejuvenation list has been finalized, the applications identified in rejuvenation list 260 are rejuvenated (predefined process 290, see FIG. 3 and corresponding text for processing details). After some period of time, the rejuvenation manager loops back to the beginning to select applications for rejuvenation. This looping continues until the rejuvenation manager is terminated (i.e., the system is shutdown).

FIG. 3 is a flowchart showing the interaction between the rejuvenation manager, the replication manager, and the new software application replicas. Rejuvenation manager processing commences at 300 whereupon, at step 305, the rejuvenation manager selects the first application from rejuvenation list 260 that was prepared using the logic shown in FIG. 2. A determination is made as to whether the selected application is already being rejuvenated (decision 306). If the application is not already being rejuvenated, decision 306 branches to "no" branch 308 whereupon, at step 310, the rejuvenation manager requests replication of the selected application. On the other hand, if the application is already being rejuvenated, decision 306 branches to "yes" branch 312 which bypasses step 310.

A determination is made as to whether is made as to whether there are more applications listed in rejuvenation list 260. If there are more applications listed, decision 315 branches to "yes" branch 320 whereupon, at step 325, the next application is selected from rejuvenation list 260 and processing loops back to request replication of the selected application. This looping continues until all applications listed in rejuvenation list 260 have been processed, at which time decision 315 branches to "no" branch 330 and processing returns at 335.

Replication manager processing commences at 340 whereupon, at step 345, the replication manager receives a replication request from the rejuvenation manager. At step 350, the replication manager initiates a new instance of the application. A determination is made as to whether there are more replication requests (decision 355). If there are more requests, decision 355 branches to "yes" branch 360 whereupon processing loops back to handle the next request. This looping continues until all requests have been handled, whereupon replication manager processing ends at 370.

New replica processing commences at 375. When a new replica of an application is created, the new replica is initialized in order to receive state data from the active replica and in order to begin processing client requests (predefined process 380, see FIG. 4 and corresponding text for processing details). Initialization of the new replica thereafter ends at 395.

Figure 4:
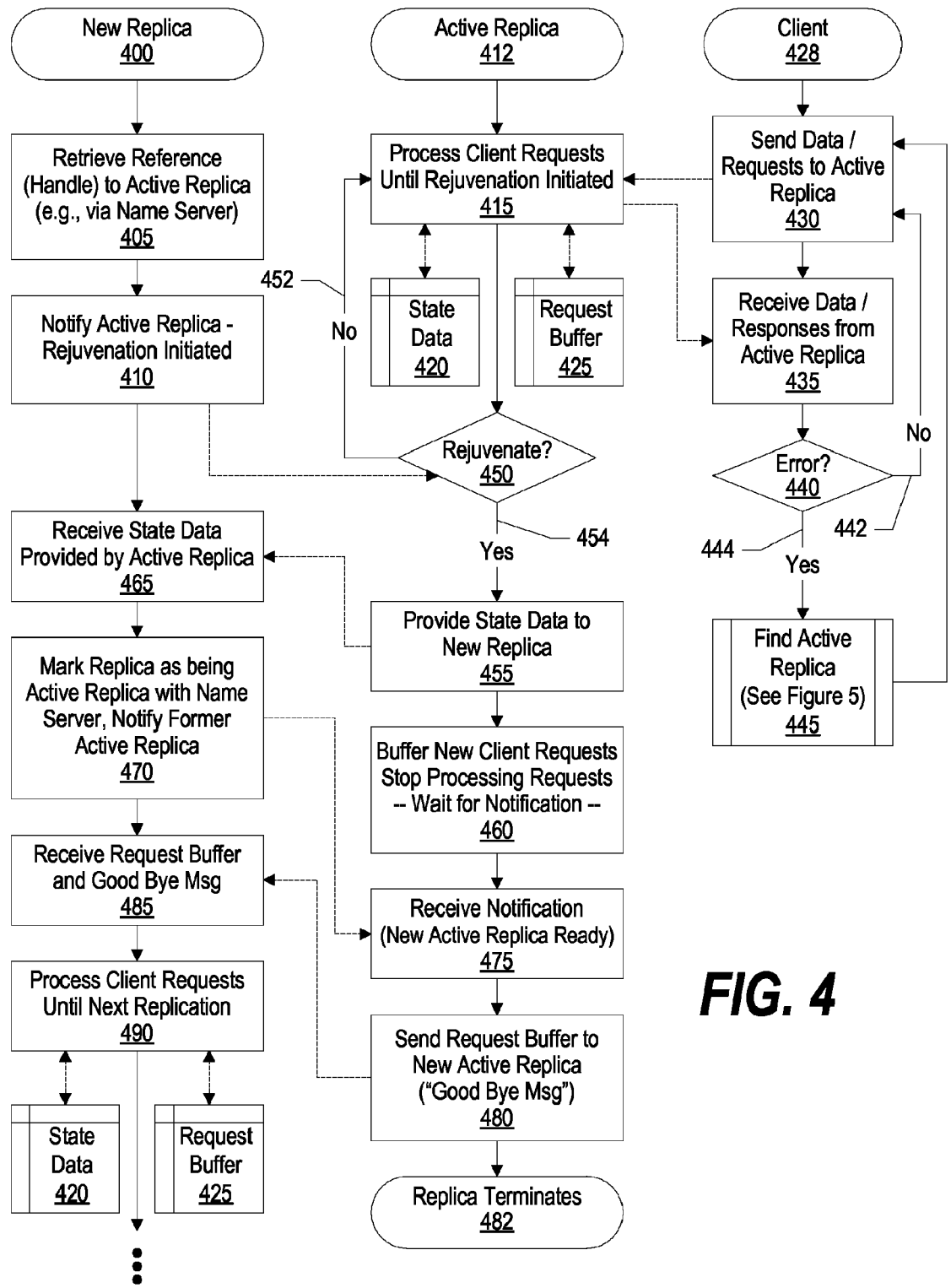
FIG. 4 is a flowchart showing the interaction between a new replica, the current active replica, and the client.

FIG. 4 is a flowchart showing the interaction between a new replica, the current active replica, and the client. New replica initialization commences at 400 whereupon, at step 405, the new replica receives the reference (handle) corresponding to the current active replica of the application program. In one embodiment, a Name Server is utilized to provide the handle to the active replica (see FIG. 1 where the client receives the handle of the active replica from the name server). At step 410, the new replica notifies the active replica that rejuvenation has commenced.

The depiction of active replica processing starts at 412 where the active replica is busy processing client requests (step 415). While processing client requests, the active replica updates state data 420 that corresponds to the state of one or more client sessions. In a stateless environment, the state data may not exist or the state data may be stored on at the client and transmitted to the active replica as part of the request. In addition, when client requests are received they are stored in request buffer 425. In one embodiment, active replica reads and processes requests from the request buffer in the order they were received (i.e., FIFO).

The depiction of client processing starts at 428 with the client sending data and requests to the active replica for processing (step 430). At step 435, responses and data are received from the active replica. A determination is made as to whether an error has been received indicating that the active replica is no longer available (decision 440). So long as no error is received, decision 440 branches to "no" branch 442 which continually loops back to send more requests and receive more responses from the active replica. When an error is received indicating that the active replica is no longer available, decision 440 branches to "yes" branch whereupon the client attempts to find the handle of the new active replica (the new replica) at predefined process 445 (see FIG. 5 and corresponding text for processing details). When the handle of the new active replica is identified, processing loops back to send requests and receive responses from the new active replica. Client processing continues to send requests and receive responses from any number of a succession of active replicas until client processing terminates.

Returning to active replica processing, as explained above, the active replica continues to process client requests until a rejuvenation notification is received (decision 450). If a rejuvenation notification has not been received then decision 450 branches to "no" branch 452 which loops back to continue processing client requests. However, when a rejuvenation notification is received, decision 450 branches to "yes" branch 454 whereupon, at step 455, state data 420 is provided to the new replica. The active replica, at step 460, continues to store requests received from the client in request buffer 425. However, the active replica stops processing these requests and instead waits for notification that the new replica is ready to take over as the active replica.

Returning to new replica processing, at step 465, the new replica receives the state data that was provided by the active replica. At step 470, the new replica is marked as being the "active replica" with the name server and the former active replica is notified that the new replica is ready to assume control and process client requests.

Returning to active replica processing, at step 475, the notification is received that the new replica is ready to take over as the active replica. The active replica responds by providing request buffer 425 to the new active replica along with a "good bye" message. The active replica, having turned over both the state data and the request buffer to the new replica, thereafter terminates at 482. At this point, additional requests sent by the client to the active replica will cause an error because the active replica has terminated. However, as explained above, client processing will recover by finding the handle of the new active replica and will continue sending requests to the new active replica.

Finally, returning to new replica processing, at step 485 the new replica receives request buffer 425 and the good bye message from the active replica. At step 490, the new replica (now the new active replica), commences processing client requests stored in request buffer 425 and maintaining state data 420. New requests received from the client are stored in the request buffer for processing. The new replica continues processing client requests until another rejuvenation process takes place, at which time another new replica will take control and process client requests, as described above.

Figure 5:
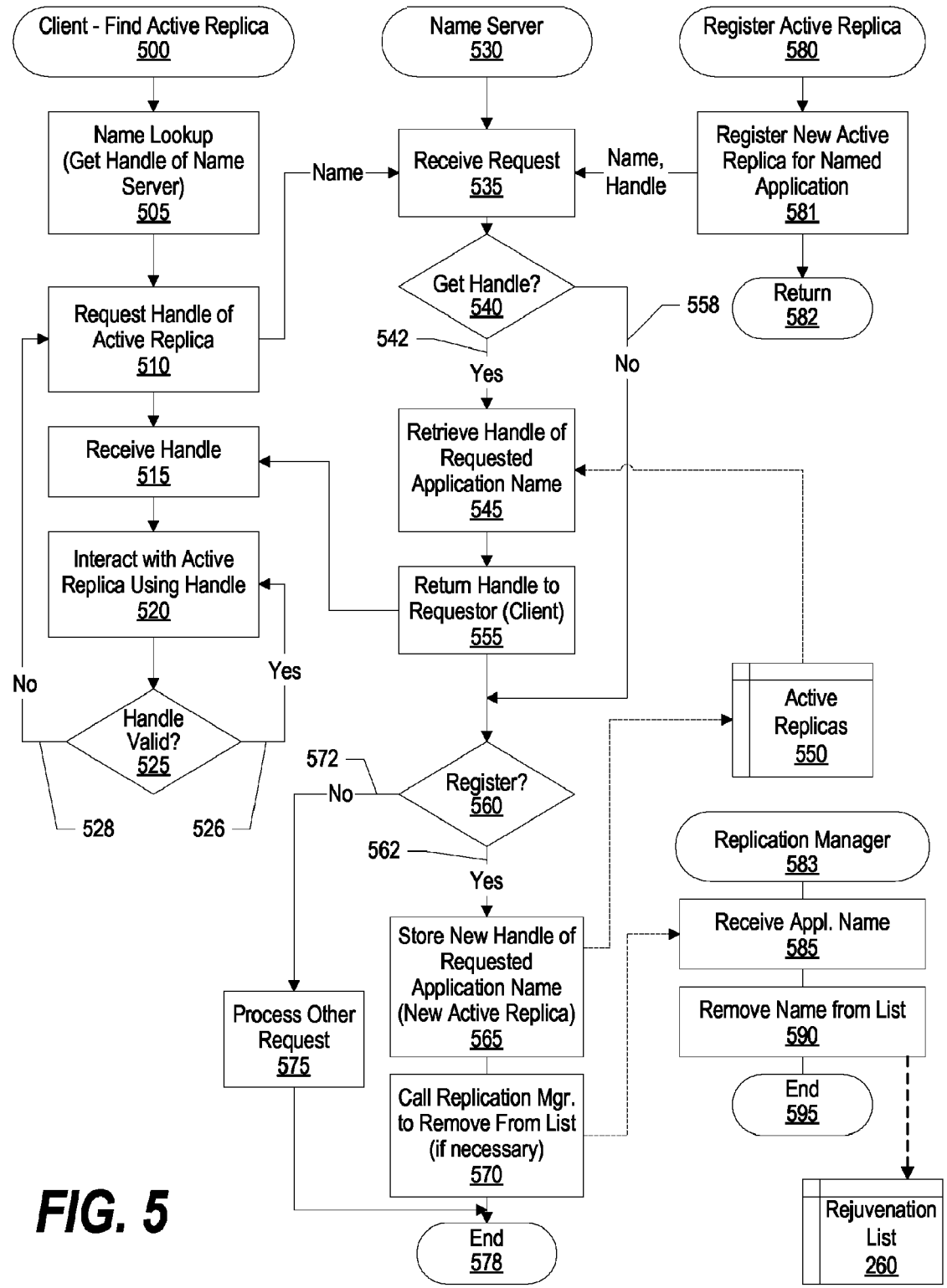
FIG. 5 is a flowchart showing the interaction between the client, the name server, and the application.

FIG. 5 is a flowchart showing the interaction between the client, the name server, and the application. When a client receives an error message indicating that the active replica is unavailable, it commences the processing shown starting at 500. At step 505, the client requests the handle of the name server on the system. In one embodiment, the name server registers with the operating system, such as the system registry, so that it can be used by clients and other processes. Once the handle of the name server is received, at step 510, the client sends a request for the handle of the active replica to the name server. From the client's perspective, the next operation is a response from the name server which is received at step 515. Ideally, the response from the name server includes the handle of the active replica, however, if the application does not have an active replica registered with the name server, an error would result and additional error processing would take place by the client. If the client received the handle of the active replica, then, at step 520, the client interacts with the active replica by sending requests and receiving responses. A determination is repeatedly made as to whether the handle to the active replica is still valid (decision 525). If the handle is still valid, decision 525 branches to "yes" branch 526 whereupon the client continues interacting with the active replica using the handle supplied by the name server. On the other hand, if the handle is no longer valid (i.e., the client received an error message while trying to communicate with the active replica), then decision 525 branches to "no" branch 528 which loops back to request a different handle to a new active replica.

When a new replica is initiated (either for the first time or during a rejuvenation process as described in FIG. 4), the new replica registers with the name server. This processing commences at 580 whereupon, at step 581, the new replica sends the application name of which it is an instance and its handle to the name server. This aspect of new replica processing then ends at 582.

The name server processing depicted in FIG. 5 commences at 530 whereupon, at step 535, the name server receives a request. A determination is made as to whether the request is for the handle of an application (decision 540). If the request is for the handle of an application (i.e., from a client process or from a new replica seeking the handle of the current active replica), then decision 540 branches to "yes" branch 542 whereupon, at step 545, the handle of the requested named application is retrieved from active replicas data store 550 and, at step 555, the retrieved handle is returned to the requester (the client in this case). Returning to decision 540, if the request was not for the handle of a named application, decision 540 branches to "no" branch 558 bypassing steps 545 and 555.

Another determination is made by the name server as to whether the request is to register an active replica for an application (decision 560). If the request is to register an active replica for an application, decision 560 branches to "yes" branch 562 whereupon, at step 565, the new handle corresponding to the active replica of the application is stored in active replica data store 550. At step 570, the name server calls the replication manager in order to remove the application from the rejuvenation list, if necessary. On the other hand, if the request is not to register an active replica for an application, then decision 560 branches to "no" branch 572 whereupon the other type of name server request is processed at step 575. Thereafter, the name server processing depicted in FIG. 5 ends at 578.

Replication manager processing shown in FIG. 5 commences at 583 whereupon, at step 585, the replication manager receives an application name from the name server. The replication manager, at step 590, then removes the application name from rejuvenation list 260, signifying that the application has been fully rejuvenated. If the application name is not found in rejuvenation list 260, this signifies that the application was likely initiated by the client or other process and that the active replica was not rejuvenated by the rejuvenation manager. Replication manager processing shown in FIG. 5 thereafter terminates at 595.

Figure 6:
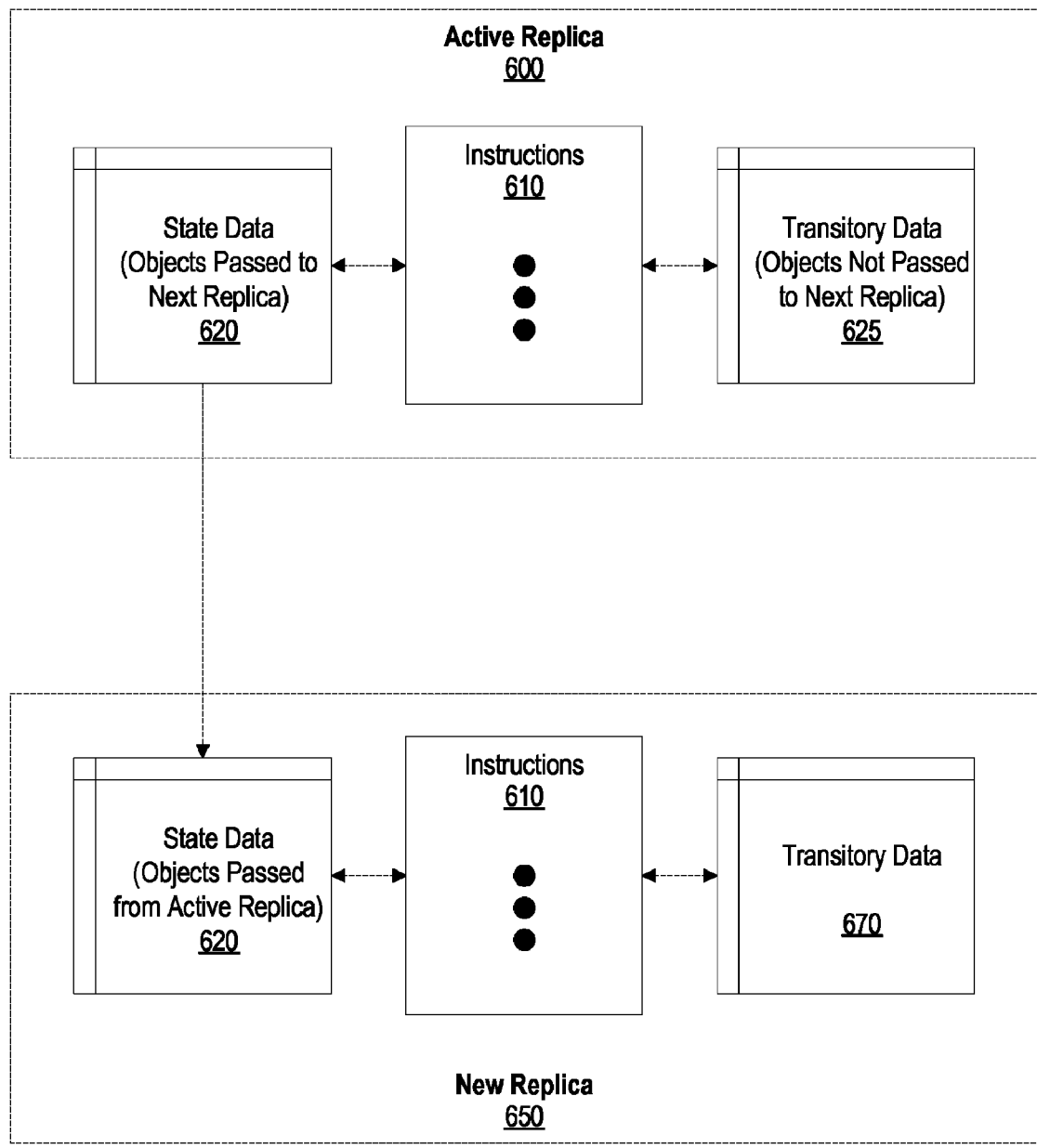
FIG. 6 is a diagram showing design considerations useful in transferring state data from the current active replica to a new replica.

FIG. 6 is a diagram showing design considerations useful in transferring state data from the current active replica to a new replica. During the design of applications that will be rejuvenated, it may be helpful to differentiate between state data (620) and transitory data (625). State data 620 may be objects, data structures, or data stored in memory that is needed to recreate the current state of the application being used by the client. Transitory data 625, on the other hand, are memory, data structures, and objects that may have been used to generate state data 620 but are not needed to recreate the current state of the application. In the diagram, active replica 600 is shown with instructions 610 that differentiate between state data 620 and transitory data 625.

When new replica 650 is created, it executes a copy of the same instructions (610) that was used by the active replica. As the name implies, new replica is a copy of the code (instructions) that are used by active replica 600. However, to minimize the effects of aging, new replica 650 receives a copy of state data 620 from active replica 600, however new replica 650 commences with newly initiated transitory data 670. Transitory data 625 is not copied to transitory data 670. In this manner, garbage that may have been collected in transitory data 625 is not permeated to transitory data area 670 of the new replica.

Figure 7:
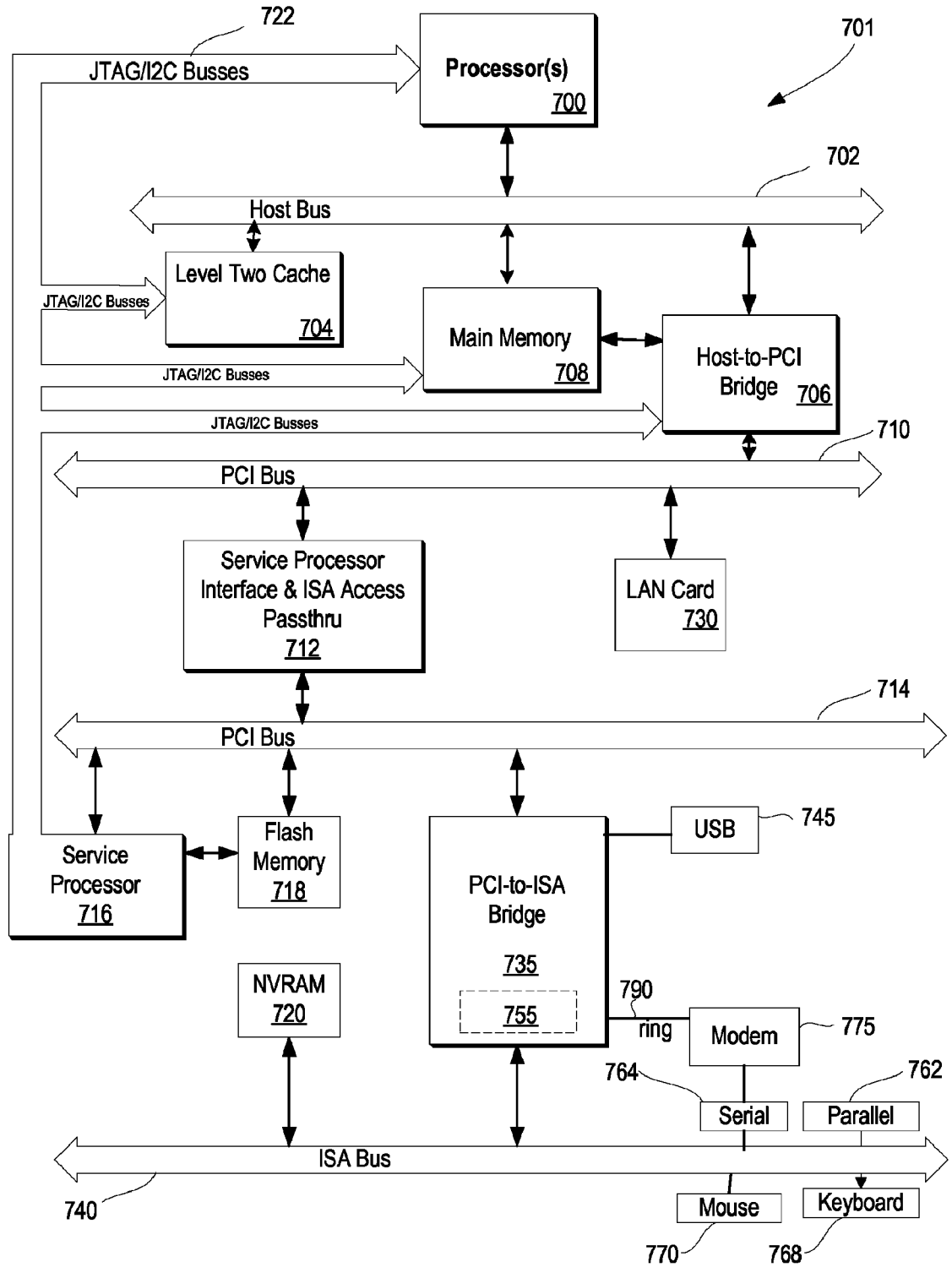
FIG. 7 illustrates information handling system 701 which is a simplified example of a computer system capable of performing the computing operations described herein.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method of rejuvenating a plurality of software applications, the method comprising:
   selecting the plurality of software applications from a list of active software applications, wherein each of the plurality of software applications is a rejuvenation candidate in response to determining that each of the plurality of software applications supports rejuvenation and is not currently being rejuvenated;
   including each of the rejuvenation candidates in a rejuvenation list;
   comparing the number of rejuvenation candidates in the rejuvenation list to a predetermined rejuvenation limit;
   removing one or more of the rejuvenation candidates from the rejuvenation list in response to the number of rejuvenation candidates in the rejuvenation list exceeding the predetermined rejuvenation limit, resulting in the rejuvenation list including one or more remaining rejuvenation candidates;
   replicating each of the remaining rejuvenation candidates, the replicating including:
   identifying a plurality of active replicas, wherein each of the plurality of active replicas maintains state data while handling client requests and corresponds to one of the remaining rejuvenation candidates;
   creating a plurality of new replicas, wherein each of the plurality of new replicas corresponds to one of the plurality of active replicas; and
   transferring the state data maintained by each of the plurality of active replicas to the corresponding one of the plurality of new replicas in order to recreate a current state of each of the corresponding plurality of software applications;
   redirecting the client requests directed to each of the plurality of active replicas to the corresponding one of the plurality of new replicas; and
   terminating each of the plurality of active replicas after the transferring and the redirecting.

2. The method of claim 1 wherein the plurality of new replicas become the plurality of active replicas after the plurality of active replicas are terminated.

3. The method of claim 1 wherein the redirecting further comprises:
   requesting, from a client process that sends one of the client requests, a handle of one of the plurality of active replicas corresponding to the software application;
   in response to the request:
      sending the handle of the corresponding active replica to the client process prior to the redirecting; and
      sending the handle of a corresponding one of the plurality of new replicas to the client process after the redirecting.

4. The method of claim 3 wherein the sending is performed by a name server, the method further comprising:
   registering the corresponding active replica with the name server prior to the redirecting by associating the handle of the corresponding active replica with the software application;
   registering the corresponding new replica with the name server, the registering of the corresponding new replica including associating the handle of the corresponding new replica with the software application and removing the association of the corresponding active replica with the software application;
   retrieving a handle associated with the software application, wherein the handle is selected from the group consisting of an active replica handle and a new replica handle; and
   sending the retrieved handle to the client process.

5. The method of claim 1 wherein each of the plurality of active replicas maintains the state data and transitory data while handling the client requests, the method further comprising:
   deleting the transitory data without passing the transitory data to each of the plurality of new replicas.

6. The method of claim 1 further comprising:
   sending a new request from a client process to a particular one of the plurality of active replicas after the particular active replica has been terminated;
   receiving an error in response to the sending;
   identifying one of the plurality of new replicas in response to receiving the error message; and
   resending the new request to the identified new replica.

7. The method of claim 1 further comprising:
   receiving, at a particular one of the plurality of active replicas, a notification from a corresponding one of the plurality of new replicas prior to the transferring of the state data;

buffering client requests in a request buffer after receiving the notification and ceasing the handling of the client requests after receiving the notification;

transferring the request buffer from the particular active replica to the corresponding new replica prior to the terminating of the particular active replica; and handling, by the corresponding new replica, the requests stored in the request buffer after the state data has been transferred from the particular active replica to the corresponding new replica.

8. An information handling system comprising:

one or more processors;

a memory accessible by the processors;

a set of instructions executed by the processors to perform actions of:

selecting a plurality of software applications from a list of active software applications, wherein each of the plurality of software applications is a rejuvenation candidate in response to determining that each of the plurality of software applications supports rejuvenation and is not currently being rejuvenated;

including each of the rejuvenation candidates in a rejuvenation list;

comparing the number of rejuvenation candidates in the rejuvenation list to a predetermined rejuvenation limit;

removing one or more of the rejuvenation candidates from the rejuvenation list in response to the number of rejuvenation candidates in the rejuvenation list exceeding the predetermined rejuvenation limit, resulting in the rejuvenation list including one or more remaining rejuvenation candidates;

replicating each of the remaining rejuvenation candidates, the replicating including:

identifying a plurality of active replicas, wherein each of the plurality of active replicas maintains state data while handling client requests and corresponds to one of the remaining rejuvenation candidates;

creating a plurality of new replicas, wherein each of the plurality of new replicas corresponds to one of the plurality of active replicas; and transferring the state data maintained by each of the plurality of active replicas to the corresponding one of the plurality of new replicas in order to recreate a current state of each of the corresponding plurality of software applications;

redirecting the client requests directed to each of the plurality of active replicas to the corresponding one of the plurality of new replicas; and terminating each of the plurality of active replicas after the transferring and the redirecting.

9. The information handling system of claim 8 wherein the redirecting further comprises instructions to perform actions of:

requesting, from a client process that sends one of the client requests, a handle of one of the plurality of active replicas corresponding to the software application;

in response to the request:

sending the handle of the corresponding active replica to the client process prior to the redirecting; and sending the handle of a corresponding one of the plurality of new replicas to the client process after the redirecting, registering the corresponding active replica with the name server prior to the redirecting by associating the handle of the corresponding active replica with the software application;

registering the corresponding new replica with the name server, the registering of the corresponding new replica including associating the handle of the corresponding new replica with the software application and removing the association of the corresponding active replica with the software application;

retrieving a handle associated with the software application, wherein the handle is selected from the group consisting of an active replica handle and a new replica handle; and sending the retrieved handle to the client process.

10. The information handling system of claim 8 further comprising instructions to perform the actions of:

sending a new request from a client process to a particular one of the plurality of active replicas after the particular active replica has been terminated;

receiving an error in response to the sending;

identifying one of the plurality of new replicas in response to receiving the error message; and resending the new request to the identified new replica.

11. The information handling system of claim 8 further comprising instructions to perform the actions of:

receiving, at a particular one of the plurality of active replicas, a notification from a corresponding one of the plurality of new replicas prior to the transferring of the state data;

buffering client requests in a request buffer after receiving the notification and ceasing the handling of the client requests after receiving the notification;

transferring the request buffer from the particular active replica to the corresponding new replica prior to the terminating of the particular active replica; and handling, by the corresponding new replica, the requests stored in the request buffer after the state data has been transferred from the particular active replica to the corresponding new replica.

12. A computer program product in a computer-readable medium comprising functional descriptive material that, when executed by a computer, directs the computer to perform actions of:

selecting the plurality of software applications from a list of active software applications, wherein each of the plurality of software applications is a rejuvenation candidate in response to determining that each of the plurality of software applications supports rejuvenation and is not currently being rejuvenated;

including each of the rejuvenation candidates in a rejuvenation list;

comparing the number of rejuvenation candidates in the rejuvenation list to a predetermined rejuvenation limit;

removing one or more of the rejuvenation candidates from the rejuvenation list in response to the number of rejuvenation candidates in the rejuvenation list exceeding the predetermined rejuvenation limit, resulting in the rejuvenation list including one or more remaining rejuvenation candidates;

replicating each of the remaining rejuvenation candidates, the replicating including:

identifying a plurality of active replicas, wherein each of the plurality of active replicas maintains state data while handling client requests and corresponds to one of the remaining rejuvenation candidates;

creating a plurality of new replicas, wherein each of the plurality of new replicas corresponds to one of the plurality of active replicas; and transferring the state data maintained by each of the plurality of active replicas to the corresponding one of the plurality of new replicas in order to recreate a current state of each of the corresponding plurality of software applications;

redirecting the client requests directed to each of the plurality of active replicas to the corresponding one of the plurality of new replicas; and terminating each of the plurality of active replicas after the transferring and the redirecting.

13. The program product of claim 12 wherein the redirecting further comprises functional descriptive material that, when executed by a computer, directs the computer to perform actions of:

requesting, from a client process that sends one of the client requests, a handle of one of the plurality of active replicas corresponding to the software application;

in response to the request:
sending the handle of the corresponding active replica to the client process prior to the redirecting; and
sending the handle of a corresponding one of the plurality of new replicas to the client process after the redirecting, registering the corresponding active replica with the name server prior to the redirecting by associating the handle of the corresponding active replica with the software application;

registering the corresponding new replica with the name server, the registering of the corresponding new replica including associating the handle of the corresponding new replica with the software application and removing the association of the corresponding active replica with the software application;

retrieving a handle associated with the software application, wherein the handle is selected from the group consisting of an active replica handle and a new replica handle; and sending the retrieved handle to the client process.

14. The program product of claim 12 further comprising functional descriptive material that, when executed by a computer, directs the computer to perform actions of:

sending a new request from a client process to a particular one of the plurality of active replicas after the particular active replica has been terminated;

receiving an error in response to the sending;

identifying one of the plurality of new replicas in response to receiving the error message; and resending the new request to the identified new replica.

15. The program product of claim 12 further comprising functional descriptive material that, when executed by a computer, directs the computer to perform actions of:

receiving, at a particular one of the plurality of active replicas, a notification from a corresponding one of the plurality of new replicas prior to the transferring of the state data;

buffering client requests in a request buffer after receiving the notification and ceasing the handling of the client requests after receiving the notification;

transferring the request buffer from the particular active replica to the corresponding new replica prior to the terminating of the particular active replica; and handling, by the corresponding new replica, the requests stored in the request buffer after the state data has been transferred from the particular active replica to the corresponding new replica.

* * * * *